(12) United States Patent
Douma

(10) Patent No.: US 8,752,477 B2
(45) Date of Patent: Jun. 17, 2014

(54) METHOD FOR CONTROLLING A PRESSURE OF HOT WATER WHICH IS USED IN A PROCESS OF MAKING ESPRESSO BY ADJUSTING SIZE OF BREWING CHAMBER

(75) Inventor: Sipke Theo Douma, Hoogeveen (NL)

(73) Assignee: Koninklijke Philips N.V., Eindhoven (NL)

( * ) Notice: Subject to any disclaimer, the term of this patent is extended or adjusted under 35 U.S.C. 154(b) by 693 days.

(21) Appl. No.: 12/442,563

(22) PCT Filed: Sep. 20, 2007

(86) PCT No.: PCT/IB2007/053830
§ 371 (c)(1),
(2), (4) Date: Mar. 24, 2009

(87) PCT Pub. No.: WO2008/038201
PCT Pub. Date: Apr. 3, 2008

(65) Prior Publication Data
US 2010/0086654 A1     Apr. 8, 2010

(30) Foreign Application Priority Data
Sep. 25, 2006   (EP) .................................... 06121189

(51) Int. Cl.
*A47J 31/44*       (2006.01)
(52) U.S. Cl.
USPC ............................................... 99/288; 99/287
(58) Field of Classification Search
CPC ............ A47J 31/10; A47J 31/44; A47J 31/40
USPC ....... 99/279–280, 284, 302 R, 304, 306–307, 99/287
See application file for complete search history.

(56) References Cited

U.S. PATENT DOCUMENTS

| 5,237,911 | A | * | 8/1993 | Aebi ................................. 99/287 |
| 5,255,593 | A | * | 10/1993 | Bunn et al. ....................... 99/280 |
| 6,142,063 | A | * | 11/2000 | Beaulieu et al. ................. 99/283 |
| 6,779,435 | B1 | * | 8/2004 | Iacobucci ..................... 99/302 R |
| 2005/0193891 | A1 | | 9/2005 | Garson et al. | |

FOREIGN PATENT DOCUMENTS

| DE | 19841680 C1 | 3/2000 |
| EP | 0328705 A1 | 8/1989 |
| EP | 0545853 A1 | 6/1993 |
| EP | 0885581 A1 | 12/1998 |
| EP | 1050259 A1 | 11/2000 |
| EP | 1308115 A1 | 5/2003 |
| EP | 1593328 A2 | 11/2005 |
| JP | 61103033 U1 | 7/1986 |
| JP | 2001167354 A | 6/2001 |
| JP | 2002008126 A | 1/2002 |
| WO | 0001283 | 1/2000 |
| WO | 0174212 A1 | 10/2001 |

* cited by examiner

Primary Examiner — Henry Yuen
Assistant Examiner — Phuong Nguyen

(57) ABSTRACT

An Espresso making device includes a brew chamber for enclosing a quantity of coffee grind, and a tube for supplying pressurized hot water to the brew chamber. Espresso is obtained by conducting the hot water through the coffee grind, where the water and the coffee grind are forced to interact. During an Espresso making process, a pressure of the water in the water supplying tube is monitored and compared to a predetermined pressure. In case the measured pressure appears to deviate from the predetermined pressure, a size of an internal volume of the brewing chamber is adjusted, so that an extent to which the coffee grind is compressed and a flow through resistance of the coffee grind are adjusted. Due to this, it is possible to adjust the pressure in such a way that the predetermined pressure is reached.

2 Claims, 1 Drawing Sheet

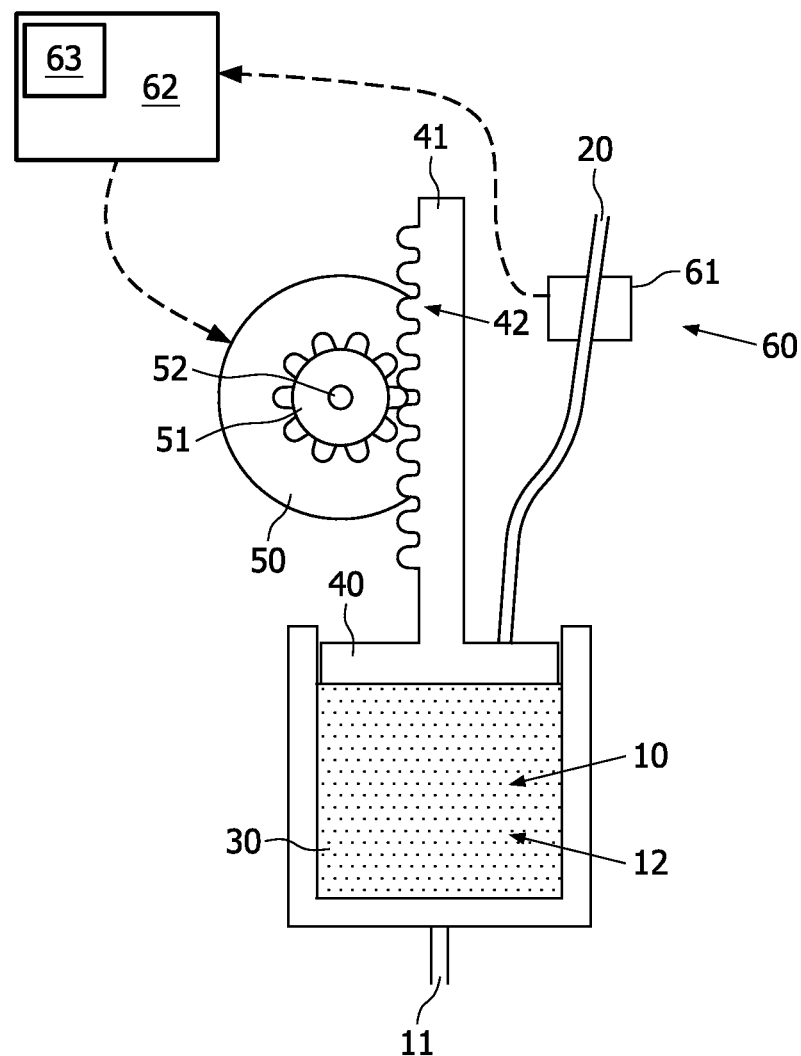

METHOD FOR CONTROLLING A PRESSURE OF HOT WATER WHICH IS USED IN A PROCESS OF MAKING ESPRESSO BY ADJUSTING SIZE OF BREWING CHAMBER

FIELD OF THE INVENTION

The present invention relates to a method for controlling a pressure of fluid which is used in a process of making a beverage on the basis of fluid and a quantity of extractable material, wherein the quantity of extractable material is enclosed in a brewing chamber.

The present invention also relates to a device for making a beverage on the basis of fluid and a quantity of extractable material, comprising a brewing chamber for containing the quantity of extractable material; and fluid supplying means for supplying fluid to the brewing chamber.

BACKGROUND OF THE INVENTION

When a beverage is made in a process of conducting a fluid such as water through a quantity of extractable material, the characteristics of the beverage, including the taste, are determined by a number of parameters related to the process. For example, when the beverage is Espresso, a brewing pressure, a brewing time, a water temperature and a quantity of ground coffee in relation to a quantity of hot water which is conducted through the coffee are important parameters. In this context, a brewing pressure should be understood as the pressure of the hot water which is conducted through the coffee, which is determined by a flow through resistance of the coffee.

Usually, Espresso is made by means of an Espresso machine, which has a brew chamber for containing the coffee. When the Espresso machine is operated, water is heated and pumped through the brew chamber, wherein the hot water interacts with the coffee, as a result of which Espresso is obtained. In the process, it is important for the brewing pressure to reach a predetermined level, and to not get higher than that value, in order to have optimal extraction of the coffee.

Various methods for controlling the brewing pressure are known. For example, WO 01/74212 discloses a coffee-making device having a brewing chamber, wherein the brewing chamber comprises a cylinder in which a piston is capable of reciprocating. The coffee-making device is suitable for preparing different types of coffee, wherein a throughput pressure of water which is used in a process of making coffee is variable, so that it is possible to set a correct value of the pressure in any possible situation. In particular, the throughput pressure of the water is controlled by a shut-off valve which is arranged in a beverage outlet of the device, and which is capable of providing for various passages.

SUMMARY OF THE INVENTION

It is an objective of the present invention to provide a method for controlling the brewing pressure in a beverage maker such as an Espresso machine, which a reliable alternative of the method known from WO 01/74212 and other known methods. This objective is achieved by a method for controlling a pressure of fluid which is used in a process of making a beverage on the basis of fluid and a quantity of extractable material, wherein the quantity of extractable material is enclosed in a brewing chamber, comprising the steps of measuring a pressure of fluid during a supply of the fluid to the brewing chamber, comparing the measured pressure to a predetermined pressure, and adjusting a size of an internal volume of the brewing chamber in case the measured pressure appears to deviate from the predetermined pressure, wherein the internal volume of the brewing chamber is increased in case the measured pressure appears to be higher than the predetermined pressure, and wherein the internal volume of the brewing chamber is decreased in case the measured pressure appears to be lower than the predetermined pressure.

An insight underlying the present invention is the fact that the brewing pressure is dependent on the extent to which the extractable material inside the brewing chamber is compressed, especially when the extractable material comprises grain or powder, which is the case when the extractable material comprises coffee, for example. In general, it is true that the more the extractable material is compressed, the higher the throughput resistance of the extractable material, and the higher the brewing pressure. In other words, the smaller the internal volume of the brewing chamber, the higher the brewing pressure. Therefore, according to the present invention, the internal volume of the brewing chamber is increased in case it appears that the brewing pressure is higher than a predetermined pressure, and the internal volume is decreased in case it appears that the brewing pressure is lower than the predetermined pressure, wherein the predetermined pressure is a pressure which is needed for obtaining a beverage having characteristics as desired. In this way, it is possible to ensure that the brewing pressure reaches the desired pressure, or at least gets as close as possible to the desired pressure, in every process of making the beverage, independent of parameters such as a size of the grains of the extractable material.

According to the present invention, the brewing pressure is measured during the process of making a beverage, and the brewing pressure is determined by measuring the pressure of fluid which is supplied to the brewing chamber. For example, in case the fluid is supplied in a fluid supply tube, all that is needed for determining the brewing pressure is measuring the pressure of the fluid by means of a pressure meter arranged at a position along the tube.

When the method according to the present invention is applied, a correct brewing pressure is automatically obtained, so that making the beverage is a process which does not require any specific skills.

Preferably, the step of measuring the pressure of fluid during a supply of the fluid to the brewing chamber is preceded by a step of setting the size of the internal volume of the brewing chamber to a predetermined initial value. The predetermined initial value may be chosen such as to be an average value of the size of the internal volume of the brewing chamber, for example. In any case, the predetermined initial value may be chosen such that the adjustments of the size of the brewing chamber which are needed for obtaining the predetermined pressure are as small as possible.

According to a possibility existing within the scope of the present invention, a piston is provided, and the size of the internal volume of the brewing chamber is adjusted mechanically by moving the piston in the brewing chamber. It will be understood that in such a case, the brewing chamber is shaped like a cylinder.

In practice, the method according to the present invention may be carried out by means of a device for making a beverage on the basis of a fluid and a quantity of extractable material. In particular, such a beverage maker comprises a brewing chamber for containing the quantity of extractable material, wherein a size of an internal volume of the brewing chamber is adjustable; a fluid supply line for supplying fluid to the brewing chamber; and a control unit for controlling a pressure of the fluid, wherein the control unit is adapted to performing the method according to the present invention.

Furthermore, the control unit comprises a pressure meter which is adapted to measuring the pressure of the fluid in the fluid supply line.

In an advantageous embodiment, the device comprises a piston, and the brewing chamber is shaped like a cylinder, wherein the piston is movably arranged in the brewing chamber. In this way, a practical construction for compressing the extractable material in the brewing chamber is realized. The device according to the present invention may comprise a rack-and-pinion drive for driving the piston.

The present invention involves measuring a pressure in a fluid supply during a process of making a beverage on the basis of the fluid and a quantity of extractable material, and adjusting the pressure at which the process is carried out when it appears that a measured pressure deviates from a predetermined pressure. The pressure is adjusted by adjusting a flow through resistance of the quantity of extractable material, which is realized by adjusting an extent to which the extractable material is compressed. As the extractable material is present in a brewing chamber, the extent to which the extractable material is compressed is dependent on a size of an internal volume of the brewing chamber. Therefore, in fact, the present invention proposes a method for varying a brewing pressure until a predetermined pressure is realized by varying the size of the internal volume of the brewing chamber.

It is noted that varying a size of an internal volume of the brewing chamber is known, for example from US 2005/0193891. This patent application publication discloses an Espresso making apparatus which includes a supply of pressurized hot water, a brewing chamber for receiving a predetermined quantity of ground coffee therein, and a piston movable within the brewing chamber to compact the coffee. For the purpose of moving the piston, a motor is utilized, wherein an amount of compression of the coffee is controlled by sensing a motor parameter such as voltage or current which is related to the amount of pressure of the coffee in the brewing chamber. In this way, a predetermined extent of compression of the coffee is realized.

In the Espresso making apparatus known from US 2005/0193891, a process of setting a predetermined amount of compression of the coffee by varying the size of the internal volume of the brewing chamber is performed preceding to the actual Espresso making process. During this latter process, no further measurements are performed. Therefore, in the Espresso making apparatus, there is no guarantee that a brewing pressure actually prevailing during an Espresso making process has a predetermined value. Contrariwise, when the method according to the present invention is applied, such a guarantee is surely obtained, on the basis of the fact that measurements of the pressure prevailing in the supply of fluid are performed during a beverage making process.

The above-described and other aspects of the present invention will be apparent from and elucidated with reference to the following description of an embodiment of a device according to the present invention.

BRIEF DESCRIPTION OF THE DRAWING

The present invention will now be explained in greater detail with reference to FIG. 1, which diagrammatically shows a brewing chamber, a piston which is movably arranged in the brewing chamber, a tube for supplying water to the brewing chamber, and a control unit for controlling a position of the piston, which are all part of an Espresso making device.

DETAILED DESCRIPTION OF AN EMBODIMENT

FIG. 1 diagrammatically shows a number of components of an Espresso making device according to the present invention. In general, it is true that Espresso is made by forcing pressurized water to flow through a quantity of coffee grind. In view of this fact, the device comprises a brewing chamber 10 for containing a quantity of coffee grind, and a tube 20 for supplying water to the brewing chamber 10. In FIG. 1, a quantity of coffee grind which is present in the brewing chamber 10 is diagrammatically represented by a number of dots, and indicated by reference numeral 30.

The brewing chamber 10 comprises an outlet 11 for letting out Espresso. According to a known option in respect of Espresso making devices, the brewing chamber 10 may be removably arranged in the Espresso making device, in order to facilitate filling and emptying of the brewing chamber 10.

During an Espresso making process, the coffee grind 30 needs to be compressed to a certain extent. To this end, the Espresso making device comprises a piston 40, which is movably arranged in the brewing chamber 10, and which is capable of sealing an open top side of the brewing chamber 10. The brewing chamber 10 is cylinder-shaped. Hence, the combination of the brewing chamber 10 and the piston 40 is adapted to function like a piston-cylinder combination, wherein the piston is used for compressing a content of the cylinder.

The piston 40 comprises a shank 41 having a toothed section 42. For the purpose of driving the piston 40, the Espresso making device comprises a motor 50, wherein a pinion 51 is arranged on an output shaft 52 of the motor 50, and wherein the pinion 51 is adapted to engage the toothed section 42 of the shank 41 of the piston 40. When the motor 50 is operated, the output shaft 52 and the pinion 51 arranged thereon are rotated, as a result of which the piston 40 is given a linear motion in a direction in which the toothed section 42 is extending, which is a direction in which a longitudinal axis of both the shank 41 of the piston 40 and the brewing chamber 10 is extending. For sake of completeness, it is noted that the toothed section 42 of the shank 41 of the piston 40 and the pinion 51 function as a rack-and-pinion drive.

When the piston 40 is moved away from the brewing chamber 10, a size of an internal volume 12 of the brewing chamber 10 is increased, and an extent to which the coffee grind 30 is compressed is decreased, and when the piston 40 is moved toward the brewing chamber 10, a size of an internal volume 12 of the brewing chamber 10 is decreased, and an extent to which the coffee grind 30 is compressed is increased. When the coffee grind 30 is compressed more and more, a flow through resistance of the coffee grind 30 increases. During an Espresso making process, a brewing pressure at which the process is performed, i.e. a pressure at which the water is conducted through the coffee grind 30, is determined by the flow through resistance of the coffee grind 30. In this respect, it is true that the higher the resistance, the higher the brewing pressure.

The brewing pressure is a determining factor for important characteristics of Espresso which is made by means of the device, including the taste, and the texture of a foam layer. Therefore, it is important for the brewing pressure to be at a predetermined level during an Espresso making process, or to be at least as close as possible to this predetermined level. On the basis of the fact that the brewing pressure is determined by the flow through resistance of the coffee grind 30, which, in its turn, is determined by the extent to which the coffee grind 30 is compressed, it is possible to control the brewing pressure by varying a position of the piston 40. The device according to the present invention comprises a control unit 60 for doing so. In particular, the control unit 60 comprises a pressure meter 61 for measuring a pressure of the water in the water supply tube 20, and a microcontroller 62 for processing the measuring results and controlling the operation of the motor 50 such as to realize a suitable positioning of the piston 40. In FIG. 1, communication between the pressure meter 61 and the microcontroller 62, and between the microcontroller 62 and the motor 50 is diagrammatically indicated in the form of dashed arrows.

The way in which the brewing pressure in the device according to the present invention is controlled will be explained in the following. In the first place, when an Espresso making process is initiated, for example when a user of the device presses a button for activating the device, the piston 40 is moved to an initial position, wherein the coffee grind 30 is compressed to a certain extent. The initial position of the piston 40 may be a predetermined position, but may also be a position which is found by taking an average of suitable positions which have been determined in preceding Espresso making processes, for example.

In respect of the process of putting the piston 40 at a certain position, it is noted that in an advantageous embodiment of the device according to the present invention, the control unit 60 comprises means for detecting an actual position of the piston 40 and providing corresponding signals to the microcontroller 62. In that case, the microcontroller 62 is adapted to compare the actual position of the piston 40 to the desired position, and to control the operation of the motor 50 in order to achieve that the actual position reaches the desired position.

As soon as the piston 40 has been moved to the initial position, the process of making Espresso may be started by supplying pressurized hot water to the brewing chamber 10. In the process, the pressure prevailing in the water is measured by means of the pressure meter 61, and signals representing the measured pressure are transmitted to the microcontroller 62. In a memory portion 63 of the microcontroller 62, information regarding an appropriate value of the pressure is present. On the basis of a comparison between the measured value and the predetermined value, it appears whether a difference between the two values exists, and whether an adjustment of the position of the piston 40 is needed. In particular, when the measured value of the pressure appears to be higher than the predetermined value, the motor 50 is activated such as to lift the piston 40, so that the internal volume 12 of the brewing chamber 10 is increased, the coffee grind 30 is compressed to a lesser extent, and the flow through resistance of the coffee grind 30 is decreased. In a situation in which the measured value of the pressure appears to be lower than the predetermined value, the motor 50 is activated such as to lower the piston 40, so that the internal volume 12 of the brewing chamber 10 is decreased, the coffee grind 30 is compressed to a higher extent, and the flow through resistance of the coffee grind 30 is increased. Eventually, in this way, the appropriate value of the brewing pressure is obtained.

An important advantage of the present invention is that it is not necessary for a user to set a force for compressing the coffee grind 30. Instead, a suitable compression of the coffee grind 30 is automatically realized on the basis of a continuous comparison between the pressure of water which is supplied to the brewing chamber 10 during an Espresso making process and a predetermined, optimal brewing pressure, wherein a position of the piston 40 is adjusted on the basis of an outcome of the comparison. By monitoring the pressure of the water in the water supply tube 20, i.e. by monitoring the parameter which needs to be controlled, a very accurate control of the brewing pressure is obtained. Therefore, when the device according to the present invention is applied, it is guaranteed that Espresso of a certain taste and quality is obtained, independent of a grain size of the coffee grind 30, for example. In this way, the device according to the present invention yields better results than devices according to the state of the art, as those latter devices are not adapted to directly measure the brewing pressure during a beverage making process and to control the extent to which the extractable material is compressed on the basis of the measuring results. In fact, by applying the present invention, it is possible to correct deviations of the brewing pressure caused by variations in characteristics of the coffee.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the FIGURE and the description, such illustration and description are to be considered illustrative or exemplary only, and not restrictive. The present invention is not limited to the disclosed embodiment.

For example, it is not necessary to have a piston 40 for compressing the quantity of extractable material which is present in the brewing chamber 10, and it is not necessary to apply a rack-and-pinion drive for causing a linear motion of a piston 40 or another movably arranged part of a delimitation of the brewing chamber 10.

For sake of completeness, it is noted that although the present invention is mainly described in a context of making Espresso on the basis of coffee grind 30 and water, it should be understood that the present invention is applicable to any process of making a beverage on the basis of a quantity of extractable material and a fluid, wherein the beverage may be hot or cold, especially when it is possible to vary the flow through resistance of the quantity of extractable material by varying an extent of compression.

Variations to the disclosed embodiment can be understood and effected by a person skilled in the art in practicing the claimed invention, from a study of the FIGURE, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, an Espresso making device which comprises a brew chamber 10 for enclosing a quantity of coffee grind 30, and a tube 20 for supplying pressurized hot water to the brew chamber 10 is described.

Espresso is obtained by conducting the hot water through the coffee grind 30, wherein the water and the coffee grind 30 are forced to interact. A brewing pressure, i.e. a pressure of the water which is conducted through the coffee grind 30, is an important factor in respect of the taste of the obtained Espresso, and the texture of a foam layer of the obtained Espresso. During an Espresso making process, a pressure of the water in the water supplying tube 20 is monitored and compared to a predetermined pressure. In case the measured pressure appears to deviate from the predetermined pressure, a size of an internal volume 12 of the brewing chamber 10 is adjusted, so that an extent to which the coffee grind 30 is compressed and a flow through resistance of the coffee grind 30 are adjusted. Due to this, it is possible to adjust the pressure in such a way that the predetermined pressure is reached.

The invention claimed is:

1. A device for making a beverage based on a liquid and a quantity of extractable material, said device comprising:
   a brewing chamber configured to contain the quantity of extractable material wherein a size of an internal volume of the brewing chamber is adjustable;
   a liquid supply line for supplying the liquid to the brewing chamber;
   a piston wherein the brewing chamber is shaped like a cylinder, wherein a size of a head of the piston is a same as a size as an opening of the brewing chamber extending between walls of the brewing chamber, and wherein the piston is movably arranged in the brewing chamber to move in the cylinder and change the internal volume of the brewing chamber; and
   a control unit configured to control a pressure of the liquid; wherein the control unit is figured to:
   measure a pressure of the liquid during a supply of the liquid to the brewing chamber,
   compare the measured pressure to a predetermined pressure, and
   adjust the size of the internal volume of the brewing chamber when the measured pressure appears to deviate from the predetermined pressure,
   wherein the piston is configured to move to increase the size of the internal volume of the brewing chamber when the measured pressure appears to be higher than the predetermined pressure, and wherein to decrease the size of the internal volume of the brewing chamber when the measured pressure appears to be lower than the predetermined pressure,
   wherein a pressure meter configured to measure the pressure of the liquid in the liquid supply line.

2. The device as claimed in claim 1, wherein said device further comprises a rack-and-pinion drive for driving the piston.

* * * * *